US011573869B2

(12) United States Patent
Haryadi et al.

(10) Patent No.: US 11,573,869 B2
(45) Date of Patent: *Feb. 7, 2023

(54) MANAGING LIFECYCLE OF VIRTUALIZATION SOFTWARE RUNNING IN A STANDALONE HOST

(71) Applicant: VMWARE, INC., Palo Alto, CA (US)

(72) Inventors: Aravinda Haryadi, Bangalore (IN); Mukund Gunti, Sunnyvale, CA (US); Naga Ullas Vankayala Harinathagupta, Santa Clara, CA (US); Arun Rajan, Sunnyvale, CA (US); Jonathan Prince Limhengco, San Francisco, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/411,171

(22) Filed: Aug. 25, 2021

(65) Prior Publication Data

US 2022/0374318 A1 Nov. 24, 2022

(30) Foreign Application Priority Data

May 20, 2021 (IN) .............................. 202141022634

(51) Int. Cl.
*G06F 11/14* (2006.01)
*G06F 11/07* (2006.01)
*G06F 3/06* (2006.01)

(52) U.S. Cl.
CPC .......... *G06F 11/1484* (2013.01); *G06F 3/067* (2013.01); *G06F 3/0619* (2013.01);
(Continued)

(58) Field of Classification Search
CPC ............. G06F 11/1484; G06F 11/0793; G06F 3/0619; G06F 3/0659; G06F 3/0664; G06F 3/067
See application file for complete search history.

(56) References Cited

U.S. PATENT DOCUMENTS

| 2009/0300151 | A1* | 12/2009 | Friedman ............ G06F 11/3664 718/1 |
| 2016/0328226 | A1* | 11/2016 | Arya ...................... G06Q 30/04 |
| 2021/0311717 | A1 | 10/2021 | Haryadi et al. |

OTHER PUBLICATIONS

U.S. Appl. No. 16/923,820, filed Jul. 8, 2020, 29 pages.

* cited by examiner

*Primary Examiner* — Jigar P Patel
(74) *Attorney, Agent, or Firm* — Kim & Stewart LLP

(57) ABSTRACT

Virtualization software installed in a standalone host is remediated according to a desired state model using a desired image of a virtualization software that is used to remediate virtualization software running in hosts which are logically grouped as a cluster of hosts not including the standalone host. The method of remediating the virtualization software installed in the standalone host includes the steps of generating a desired image of the virtualization software of the standalone host from a desired image of the virtualization software of the hosts in the cluster, and upon detecting a difference between an image of the virtualization software currently running in the standalone host and the desired image of the virtualization software of the standalone host, instructing the standalone host to remediate the image of the virtualization software currently running therein to match the desired image of the virtualization software of the standalone host.

20 Claims, 7 Drawing Sheets

(52) U.S. Cl.
CPC .......... *G06F 3/0659* (2013.01); *G06F 3/0664* (2013.01); *G06F 11/0793* (2013.01)

MANAGING LIFECYCLE OF VIRTUALIZATION SOFTWARE RUNNING IN A STANDALONE HOST

RELATED APPLICATIONS

Benefit is claimed under 35 U.S.C. 119(a)-(d) to Foreign Application Serial No. 202141022634 filed in India entitled "MANAGING LIFECYCLE OF VIRTUALIZATION SOFTWARE RUNNING IN A STANDALONE HOST", on May 20, 2021, by VMware, Inc., which is herein incorporated in its entirety by reference for all purposes.

BACKGROUND

A virtual storage solution known as VSAN (virtual storage area network) provisions a virtual storage device for a cluster of host computers using local disks of the host computers. The host computers represent data nodes of the VSAN and may be located in different availability zones to support redundant data availability for mission-critical applications. In the virtual storage device, data are stored as objects (referred to herein as VSAN objects) instead of files or blocks and the VSAN objects are backed by components that are replicated across the cluster. In a VSAN configuration with two availability zones, a standalone host referred to as a witness node, is used to host witness components for VSAN objects. The witness components are used to determine if the VSAN objects have a quorum in the event of a split-brain situation. In general, the witness node does not run user workloads and cannot be a data node.

The witness node and the data nodes are managed as a VSAN cluster, and each has a VSAN module running on top of virtualization software to enable the VSAN solution. The lifecycles of the virtualization software installed in the witness node and the virtualization software installed in the data nodes, are however, managed separately. Techniques have been developed to manage the lifecycle of the virtualization software installed in a cluster of host computers, such as the data nodes, which are managed together by a virtual machine management server for resource pooling (e.g., to provide high availability and distributed resource management), and are described in U.S. patent application Ser. No. 16/939,117, filed on Jul. 27, 2020, which is incorporated by reference herein in its entirety. These techniques do not apply to a host that the virtual machine management server manages as a standalone host, such as a witness node, and thus are not applicable to a VSAN cluster that has both data nodes and a witness node.

Consequently, any upgrades to the virtualization software installed in the data nodes that are carried out in accordance with the techniques described in U.S. patent application Ser. No. 16/939,117 will need to be tracked, and separately replicated on the witness node so that the VSAN modules running in the data nodes and the witness node can remain compatible and continue to communicate to enable the VSAN solution.

SUMMARY

One or more embodiments provide a technique that integrates lifecycle management of virtualization software that is running in a witness node of a VSAN cluster into lifecycle management of virtualization software that is running in data nodes of the VSAN cluster. More generally, one or more embodiments provide a technique that integrates lifecycle management of virtualization software that is running in a standalone host into lifecycle management of virtualization software that is running in a cluster of hosts that are managed for resource pooling.

In the embodiments, virtualization software installed in the standalone host is remediated according to a desired state model using a desired image of a virtualization software that is used to remediate virtualization software running in hosts which are logically grouped as a cluster of hosts not including the standalone host. The method of remediating the virtualization software installed in the standalone host includes the steps of generating a desired image of the virtualization software of the standalone host from a desired image of the virtualization software of the hosts in the cluster, and upon detecting a difference between an image of the virtualization software currently running in the standalone host and the desired image of the virtualization software of the standalone host, instructing the standalone host to remediate the image of the virtualization software currently running therein to match the desired image of the virtualization software of the standalone host.

According to one embodiment, an image of a first virtualization software installed in each of a plurality of first hosts is remediated based on a desired image of the first virtualization software and an image of a second virtualization software installed in a second host is remediated based on a desired image of the second virtualization software, wherein each of the first hosts include local disks and the local disks of the first hosts are aggregated and provisioned as a virtual storage device, and the second host tracks metadata of components of objects stored in the virtual storage device. The method of remediating images of the virtualization software according to this embodiment includes the steps of generating a desired image of the second virtualization software from a desired image of the first virtualization software and configuration information of the second virtualization software, and upon detecting a difference between the image of the second virtualization software, which is currently running in the second host, and the desired image of the second virtualization software, instructing the second host to remediate the image of the second virtualization software currently running in the second host to match the desired image of the second virtualization software.

Further embodiments include a non-transitory computer-readable storage medium comprising instructions that cause a computer system to carry out the above method, as well as a computer system configured to carry out the above method.

DETAILED DESCRIPTION

Figure 1:
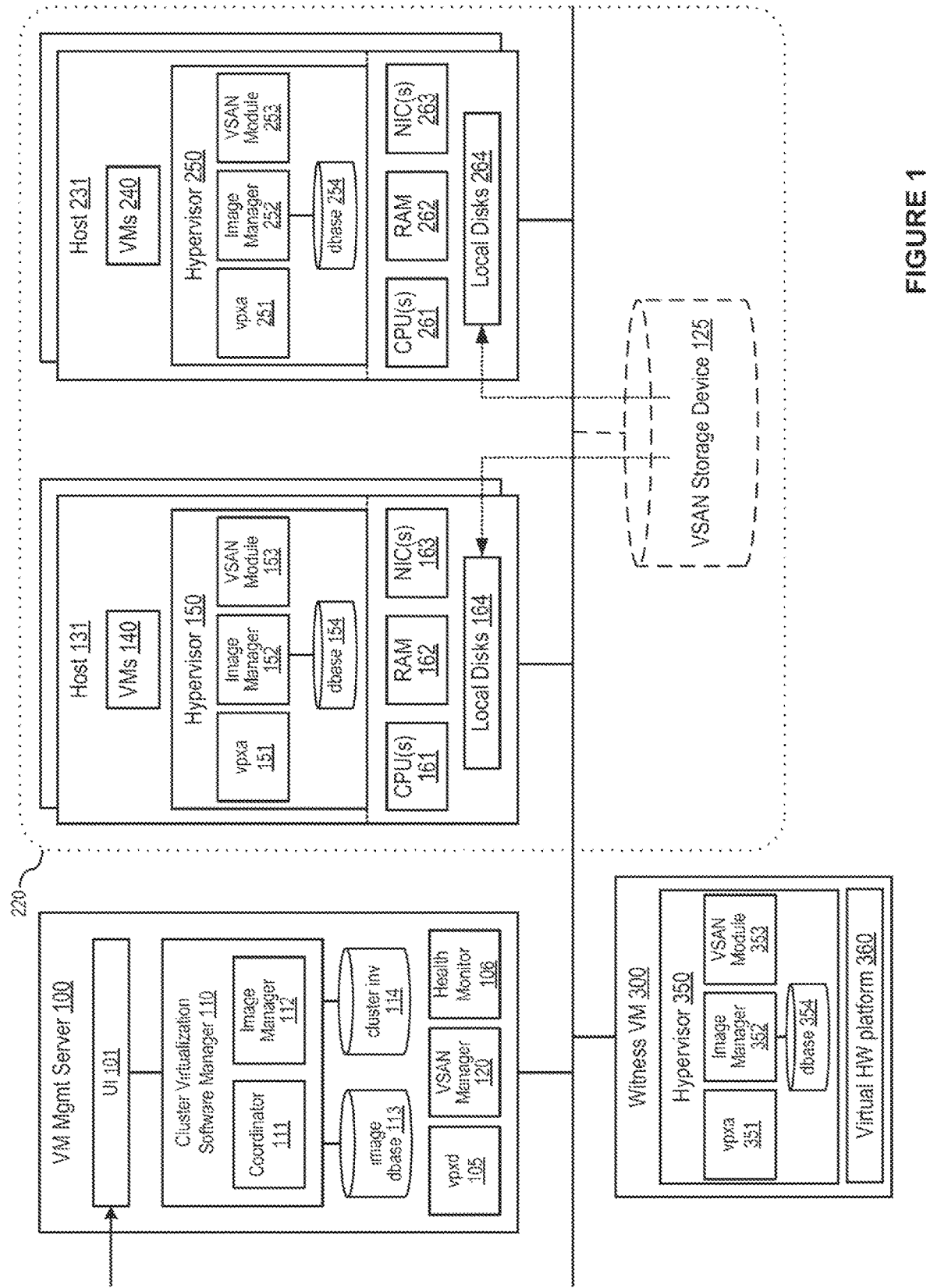
FIG. 1 is a block diagram of a virtualized computing system including data nodes and a witness node of VSAN, in which one or more embodiments may be practiced.

FIG. 1 is a block diagram of a virtualized computing system that implements a desired state model for managing the virtualization software for both data nodes of VSAN and a witness node of VSAN. The virtualized computing system includes hosts 131 and hosts 231, which are managed by a virtual machine (VM) management server 100 as a cluster (hereinafter referred to as "resource-pooling cluster" to distinguish it from a "VSAN cluster" described below) to provide cluster-level functions, such as load balancing across the cluster by performing VM migration between hosts 131, 231, distributed power management, dynamic VM placement according to affinity and anti-affinity rules, and high-availability.

In the embodiments illustrated herein, hosts 131 and hosts 231 are also data nodes of a VSAN cluster. As data nodes of a VSAN cluster, hosts 131 and hosts 231 store components of VSAN objects. In FIG. 1, VSAN storage device 125 is shown is dashed lines to represent that it is a virtual device provisioned from local disks 164 of hosts 131 and local disks 264 of hosts 231. Data that are written to VSAN storage device 125 are physically stored in the local disks and data that are read from VSAN storage device 125 are physically read from the local disks. Dotted arrows are illustrated in FIG. 1 to indicate that there is a mapping of storage blocks of VSAN storage device 125 to physical blocks of the local disks. The mapping of the storage blocks of VSAN storage device 125 to physical blocks of the local disks is managed in a distributed manner by VSAN modules 153 and VSAN modules 253.

In one embodiment, hosts 131 are located in an availability zone that is different from an availability zone in which hosts 231 are located, and the hosts of each availability zone store a copy of the components of VSAN objects. Availability zones are isolated from each other to prevent the propagation of failure or outage across zone boundaries. Availability zones may exist within the same data center or spread across data centers located in different geographical regions to support, for example, disaster recovery solutions.

A witness node shown in FIG. 1 as witness VM 300, stores metadata of the components of VSAN objects to manage data synchronization across the availability zones, but does not store any of the components of VSAN objects. The witness node also stores "witness" components that are used to determine the health status of the data nodes and to determine through a voting protocol where data should be accessed from when one of the two availability zones is down.

Embodiments are also applicable to various two-node VSAN configurations. In one such configuration, there is a single host 131 operating as one of the two data nodes, a single host 231 operating as the other of the two data nodes, and a witness VM 300 operating as the witness node. Host 131 and host 231 are located in the same availability zone and witness VM 300 is located in a different availability zone. In another such configuration, there is a single host 131 operating as one of the two data nodes, a single host 231 operating as the other of the two data nodes, and a metadata node in place of the witness node. The metadata node manages data synchronization between the data nodes but does not store any witness components because host 131, host 231, and the metadata node are all located in the same availability zone.

Each of hosts 131 and hosts 231 may be constructed on a server grade hardware platform such as an x86 architecture platform. In addition to the local disks (local disks 164 and local disks 264), the hardware platform includes one or more central processing units (CPUs) 161, 261, system memory, e.g., random access memory (RAM) 162, 262, and one or more network interface controllers (NICs) 163, 263. A virtualization software layer, also referred to herein as a hypervisor 150, 250, is installed to run on top of the hardware platform. The hypervisor supports a virtual machine execution space within which multiple VMs (e.g., VMs 140, 240) may be concurrently instantiated and executed.

Witness VM 300 is implemented as a virtual appliance running on a physical server. The virtual appliance is a virtual host having a hypervisor 350 that is installed to run on top of virtual hardware platform 360. Similar to witness VM 300, the metadata node is implemented as a virtual appliance having a hypervisor that is installed to run on top of a virtual hardware platform. Because the witness node and the metadata node are each implemented as a virtual appliance, there is no OEM specific add-ons or firmware that need to be accounted for when remediating the image of the virtualization software running in the witness node or the metadata node. There is also a economic benefit for using the virtual appliance because the cost of implementing the witness node or the metadata node as a virtual appliance is lower than implementing it as a physical host.

Despite the above advantages, embodiments are not limited to an implementation of the witness node or the metadata node as a virtual appliance. Thus, in alternative embodiments, the witness node or the metadata node may be implemented as a physical host having a hypervisor that is installed to run on top of a physical hardware platform.

VM management server 100 is a physical or virtual server that employs a vpxd process 105 to communicate with each of hosts 131, hosts 231, and witness VM 300, in particular to vpxa processes 151, 251, 351. Other processes running in VM management server 100 include a health monitor 106 for performing checks on the operational status of hosts 131 and hosts 231, cluster virtualization software manager 110 (further described below), and VSAN manager 120 (further described below).

Cluster virtualization software manager 110 manages the virtualization software installed in the hosts of the resource-pooling cluster, namely hosts 131 and hosts 231, and maintains their host IDs in a cluster inventory 114. A coordinator 111 of cluster virtualization software manager 110 coordinates the process of remediating a current image of virtualization software installed in hosts 131 and 231 to a desired image of virtualization software. Image manager 112 of cluster virtualization software manager 110 generates the desired image of virtualization software as described below in conjunction with FIG. 2A and stores the desired image of virtualization software in image database 113. Coordinator 111 communicates with each of hosts 131, hosts 231, and witness VM 300 to apply the desired image of virtualization software when there is a drift in the current state of virtualization software from the desired image of virtualization software. Further details of the management of virtualization software based on the desired image of virtualization software are described in U.S. patent application Ser. No.

16/939,117. After the desired image of virtualization software is applied, image manager 152 stores the metadata of the desired image of the virtualization software in an image database 154, and image manager 252 stores the metadata of the desired image of the virtualization software in an image database 254. Similarly, image manager 352 stores the metadata of the desired image of the virtualization software in an image database 354. Going forward, the image databases of each of hosts 131, hosts 231, and witness VM 300 operates as the single source of truth for the state of the virtualization software configured therein, and will record any changes to the state of the virtualization software in the corresponding image database.

VSAN manager 120 communicates with VSAN modules 153 in hosts 131 and VSAN modules 253 in hosts 231 to provision VSAN storage device 125 from the local disks of hosts 131 and hosts 231. After VSAN storage device 125 is provisioned, VMs 140, 240 are able to send read and write commands to VSAN storage device 125. In response to such commands, VSAN modules 153, 253 communicate with each other to read data from and write data to the local disks of hosts 131 and hosts 231. VSAN module 353 in witness VM 300 communicates with VSAN modules 153, 253 to update metadata of components of VSAN objects as components of the VSAN objects stored in local disks of hosts 131 and hosts 231 are modified.

Figure 2A:
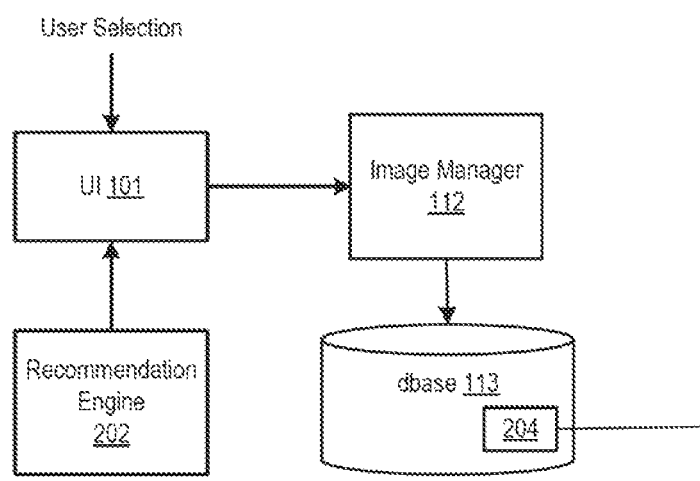
FIG. 2A is a diagram that illustrates how a desired image of virtualization software to be executed in data nodes is generated.

FIG. 2A is a diagram that illustrates how a desired image of virtualization software to be executed in data nodes (e.g., hosts 131 and hosts 231) is generated. The desired image of virtualization software to be executed in data nodes is selected by a user from a set of recommended images presented through UI 101. The set of recommended images is generated by a recommendation engine 202, which is running as a process within cluster virtualization software manager 110, as described in U.S. patent application Ser. No. 16/923,820, filed on Jul. 8, 2020, the entire contents of which are incorporated by reference herein. Image manager 112 stores the selected recommended image of virtualization software in image database 113 as the desired image of virtualization software to be executed in data nodes, which is depicted in FIG. 2A as document 204. Alternatively, the desired image of virtualization software to be executed in data nodes may be generated through user selections made through UI 101 as described in U.S. patent application Ser. No. 16/939,117.

Figure 2B:
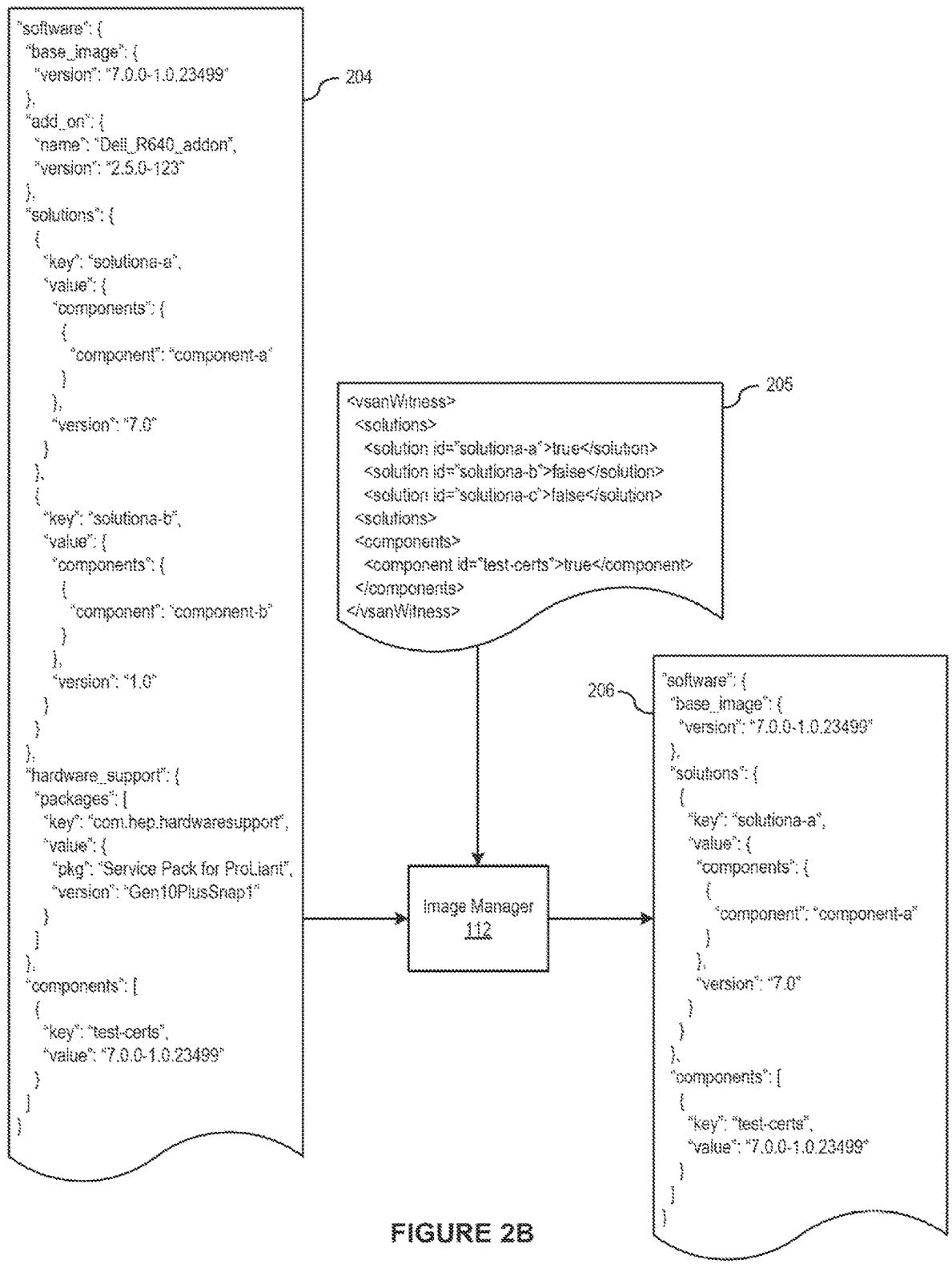
FIG. 2B is a diagram that illustrates how a desired image of virtualization software to be executed in the witness node is generated.

FIG. 2B is a diagram that illustrates how a desired image of virtualization software to be executed in a witness node (e.g., witness VM 300) is generated. The process for generating the desired image of virtualization software to be executed in witness VM 300 is carried out by image manager 112 based on two inputs. The first input is the desired image of virtualization software to be executed in data nodes, and the second input is configuration information about the desired image of virtualization software to be executed in the witness node. The configuration information for a witness node specifies add-ons, software solutions, and software components that are to be enabled or disabled in the witness node, and is stored in a configuration file. FIG. 2B depicts one example of the configuration file for a witness node as file 205. Image manager 112 performs a filtering of the desired image of virtualization software to be executed in data nodes based on the configuration information for the witness node to generate the desired image of virtualization software to be executed in the witness node. Document 206 depicted in FIG. 2B represents the desired image of virtualization software to be executed in the witness node that is generated by filtering document 204 based on file 205. Using the above technique for generating the desired image of the virtualization software to be executed in the witness node, lifecycle management of virtualization software according to a desired state model can be carried out for all nodes of a VSAN cluster based on a single expression of the desired state.

Figure 3:
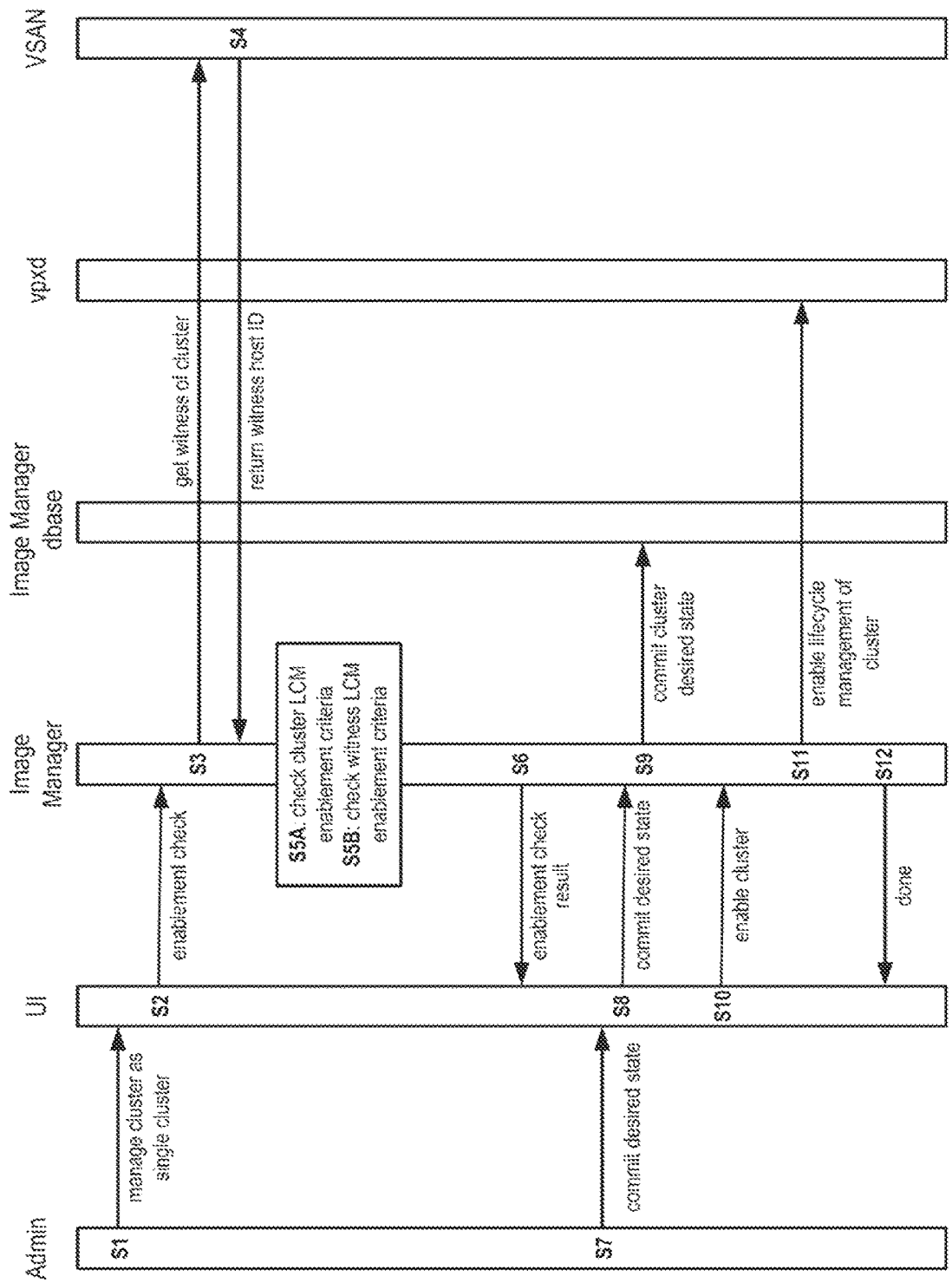
FIG. 3 is a command sequence diagram that depicts a process for checking whether or not a desired state model for managing the virtualization software can be applied to the data nodes and the witness node.

FIG. 3 is a command sequence diagram that depicts a process for checking whether or not a desired state model for managing the virtualization software can be applied to the data nodes and the witness node. At step S1, an administrator (Admin) of the virtualized computing system of FIG. 1 inputs a command through UI 101 that expresses a desire to manage the virtualization software of a VSAN cluster, which includes the data nodes and the witness node, according to the desired state model. Before doing so, however, checks are performed on the virtualization software installed in the data nodes and the witness node to determine if such a feature can be enabled on them. UI 101 at step S2 issues such an enablement check to image manager 112.

Image manager 112 at step S3 queries VSAN manager 120 for the host ID of the witness node and VSAN manager 120 at step S4 returns the host ID of the witness node. Then, at steps 5A and 5B, image manager 112 performs checks on the data nodes and the witness node to determine whether the virtualization software installed therein can be managed according to the desired state model. For example, image manager 112 checks to see if the version of the virtualization software installed in each of the data nodes and the witness node supports lifecycle management thereof according to the desired state model. In particular, if the version number is less than a minimum version number for any of the data nodes and the witness node, a message that the enablement check failed (step S6) is returned to Admin through UI 101, because this means that the virtualization software of the entire VSAN cluster cannot be managed together, i.e., according to the desired state model.

On the other hand, if the version number is greater than or equal to the minimum version number for each of the data nodes and the witness node, a message that the enablement check passed for all nodes of the VSAN cluster is returned to Admin through UI 101 (step S6). In response to this message, Admin at step S7 issues a command through UI 101 to commit the desired state of the virtualization software for the entire VSAN cluster.

In response to the command to commit the desired state, UI 101 issues two successive commands to image manager 112. The first command is issued at step S8 and is a command to commit the desired state, in response to which image manager 112 at step S9 stores the desired image of the virtualization software of the data nodes, which is generated as described above in conjunction with FIG. 2A, in image database 113. The second command is issued at step S10 and is a command to enable the VSAN cluster for lifecycle management according to the desired state model. In response to the command issued at step S10, image manager 112 at step S11 instructs vpxd process 105 to issue enablement commands to the corresponding vpxa processes (vpxa processes 151, 251, 351) in the hosts of the VSAN cluster to transition to a mode in which they will managed according to the desired state model. The command sequence shown in FIG. 3 ends when image manager 112 at step S12 indicates that the VSAN cluster has been enabled for virtualization software management according to the desired state model.

Figure 4:
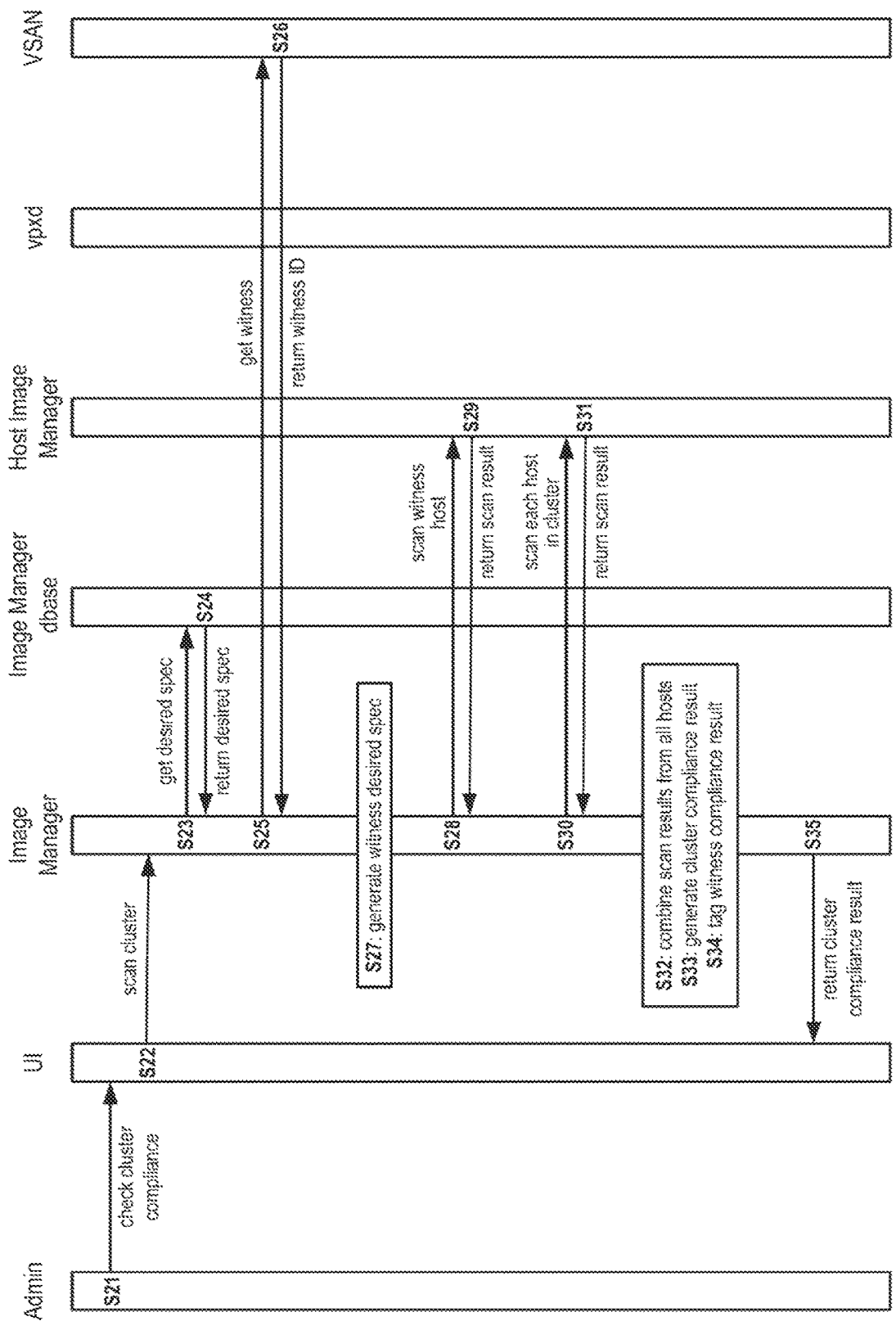
FIG. 4 is a command sequence diagram that depicts a process for performing a compliance check of the virtualization software to be executed in the data nodes and the witness node.

FIG. 4 is a command sequence diagram that depicts a process for performing a compliance check in each of the hosts of the VSAN cluster. The command sequence of FIG. 4 begins at step S21 where Admin issues a command to perform a compliance check for the VSAN cluster. In response to the command issued at step S21, UI 101 issues a scan cluster command to image manager 112 at step S22. The scan cluster command in the embodiments described herein is a command to determine the drift between the installed software on the hosts and the desired image and check that all hosts of the VSAN cluster can upgrade to the desired image of the virtualization software. Steps S23 through S35 are carried out in response to the scan cluster command issued at step S22.

At steps S23 and S24, image manager 112 communicates with image database 113 to retrieve the desired image of the virtualization software of the data nodes from image database 113. At steps S25 and S26, image manager 112 communicates with VSAN manager 120 to retrieve the host ID of the witness node. At step S27, image manager 112 retrieves the configuration file for the witness node, generates the desired image of the virtualization software of the witness node as described above in conjunction with FIG. 2B.

At step S28, image manager 112 issues a scan API to the host image manager running in the witness node (e.g., host image manager 352 running in witness VM 300). This scan API specifies a storage location from which the desired image of the virtualization software of the witness node can be retrieved. In response to this scan API, the host image manager retrieves the desired image of the virtualization software of the witness node from the specified storage location and the current state of the virtualization software from image database 354, and compares the two to determine if they are "incompatible" (which means that desired image cannot be applied, e.g., when the current state of the virtualization software is at a higher version than that of the desired image), "compliant" (which means that the current state of the virtualization software is at the same version as that of the desired image), non-compliant (which means that the current state of the virtualization software is at lower version than that of the desired image and thus can be upgraded to the desired image), or unknown (which means that a comparison could not be made because the version of the desired image is unknown or not recognizable). If non-compliant, the host image manager running in the witness node determines the impact of applying the desired image of the virtualization software thereto, in particular, whether or not it will need to enter into a maintenance mode for the desired image to be applied, and whether or not it will need to be rebooted after the desired image is applied. At step S29, the host image manager running in the witness node returns the scan results indicating one of four aforementioned compliance states, and if non-compliant, whether or not the witness node needs to enter into a maintenance mode and whether or not the witness node needs to be rebooted, to image manager 112.

At step S30, image manager 112 issues a scan API to the host image managers running in the data nodes (e.g., host image manager 152 running in each host 131 and host image manager 252 running in each host 231). This scan API specifies a storage location from which the desired image of the virtualization software of the data nodes can be retrieved. In response to this scan API, the host image manager in each data node retrieves the desired image of the virtualization software of the data nodes from the specified storage location and the current state of the virtualization software from its corresponding image database (e.g., image database 154 or image database 254), and compares the two to determine if they are "incompatible" (which means that desired image cannot be applied, e.g., when the current state of the virtualization software is at a higher version than that of the desired image), "compliant" (which means that the current state of the virtualization software is at the same version as that of the desired image), non-compliant (which means that the current state of the virtualization software is at lower version than that of the desired image and thus can be upgraded to the desired image), or unknown (which means that a comparison could not be made because the version of the desired image is unknown or not recognizable). For each host that is non-compliant, the host image manager running in that host determines the impact of applying the desired image of the virtualization software thereto, in particular, whether or not it will need to enter into a maintenance mode for the desired image to be applied, and whether or not it will need to be rebooted after the desired image is applied. At step S31, the host image manager running in each data node returns the scan results indicating one of four aforementioned compliance states, and if non-compliant, whether or not the host needs to enter into a maintenance mode and whether or not the host needs to be rebooted, to image manager 112.

Image manager 112 combines the scan results returned from all hosts of the VSAN cluster at step S32 to generate a single VSAN cluster compliance result at step S33. At step S34, image manager 112 also tags the scan result from the witness node as a witness compliance result, so that Admin will be able to differentiate between scan results from data nodes and witness node. Then, at step S35, image manager 112 returns the combined VSAN cluster compliance result to UI 101.

Figure 5:
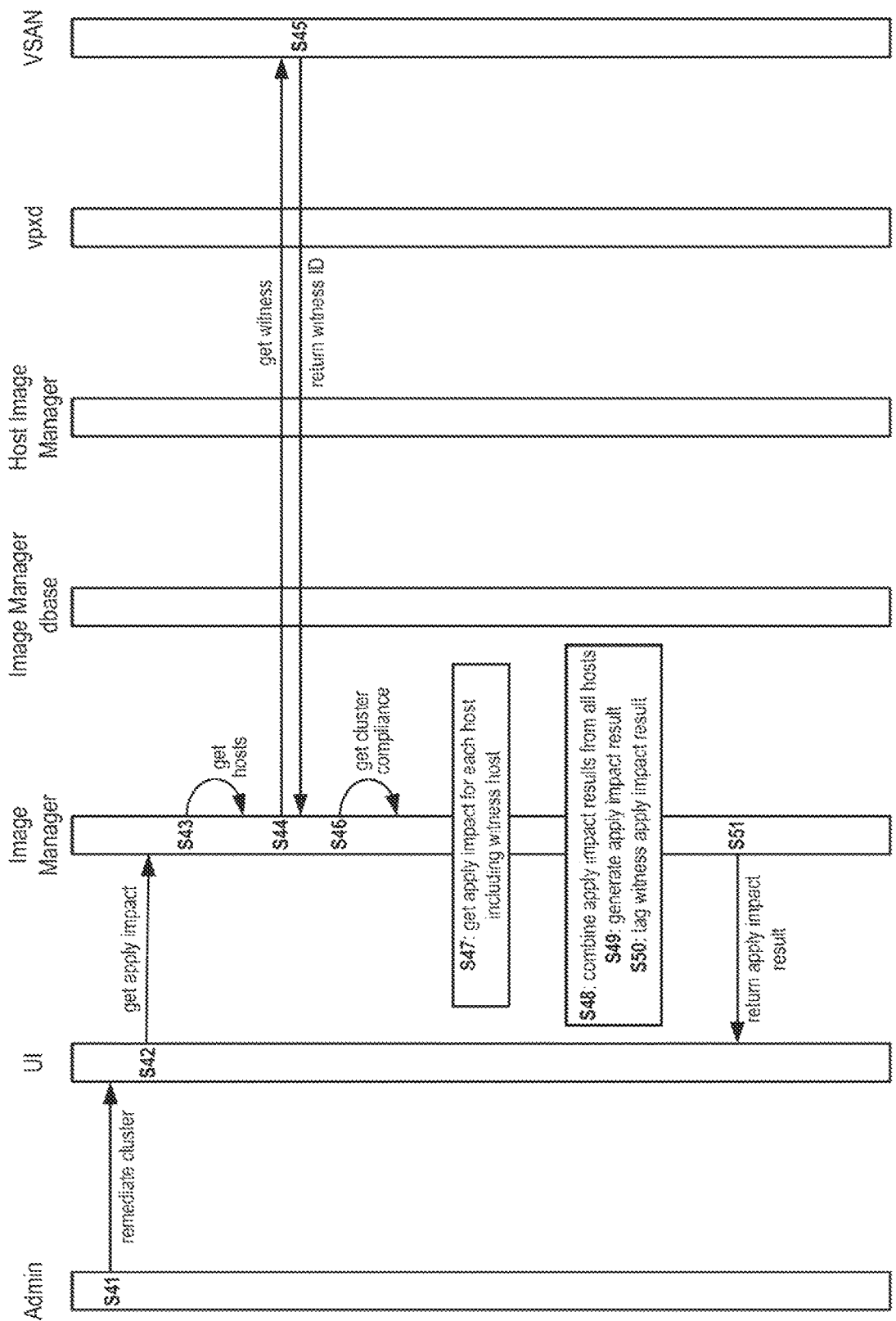
FIG. 5 is a command sequence diagram that depicts a process for determining the impact of applying the desired image of the virtualization software to the data nodes and the witness node.

FIG. 5 is a command sequence diagram that depicts a process for determining the impact of applying the desired image of the virtualization software to the data nodes and the witness node. The process depicted in FIG. 5 begins at step S41 when Admin issues a command to remediate the VSAN cluster. In response to the command to remediate the VSAN cluster, UI 101 at step S42 issues a command ("get apply impact") to assess the impact on the hosts of the VSAN cluster when the desired image of the virtualization software is applied thereto.

Steps S43 to S51 are executed in response to the "get apply impact" command. At step S43, image manager 112 acquires the host IDs of the data nodes from cluster inventory 114. Then, image manager 112 communicates with VSAN manager 120 at steps S44 and S45 to acquire the host ID of the witness node. Once the host IDs of the VSAN cluster are obtained, image manager 112 retrieves the combined VSAN cluster compliance result generated at step S33 of FIG. 4. As described above, the VSAN cluster compliance result includes scan results from the hosts and the scan results from each host contain an apply impact result, which indicates whether or not that host needs to enter into a maintenance mode and whether or not the host needs to be rebooted. At step S47, image manager 112 retrieves the apply impact result for each host of the VSAN cluster, including the data nodes and the witness node, from the VSAN cluster compliance result. Then, image manager 112 combines the apply impact results for all hosts of the VSAN cluster at step S48 to generate a single VSAN cluster apply impact result at step S49. At step S50, image manager 112 also tags the apply impact result for the witness node as a witness apply impact result, so that Admin will be able to differentiate between apply impact results for the data nodes and apply impact result for the witness node. Then, at step S51, image manager 112 returns the combined VSAN cluster apply impact result to UI 101.

Figure 6:
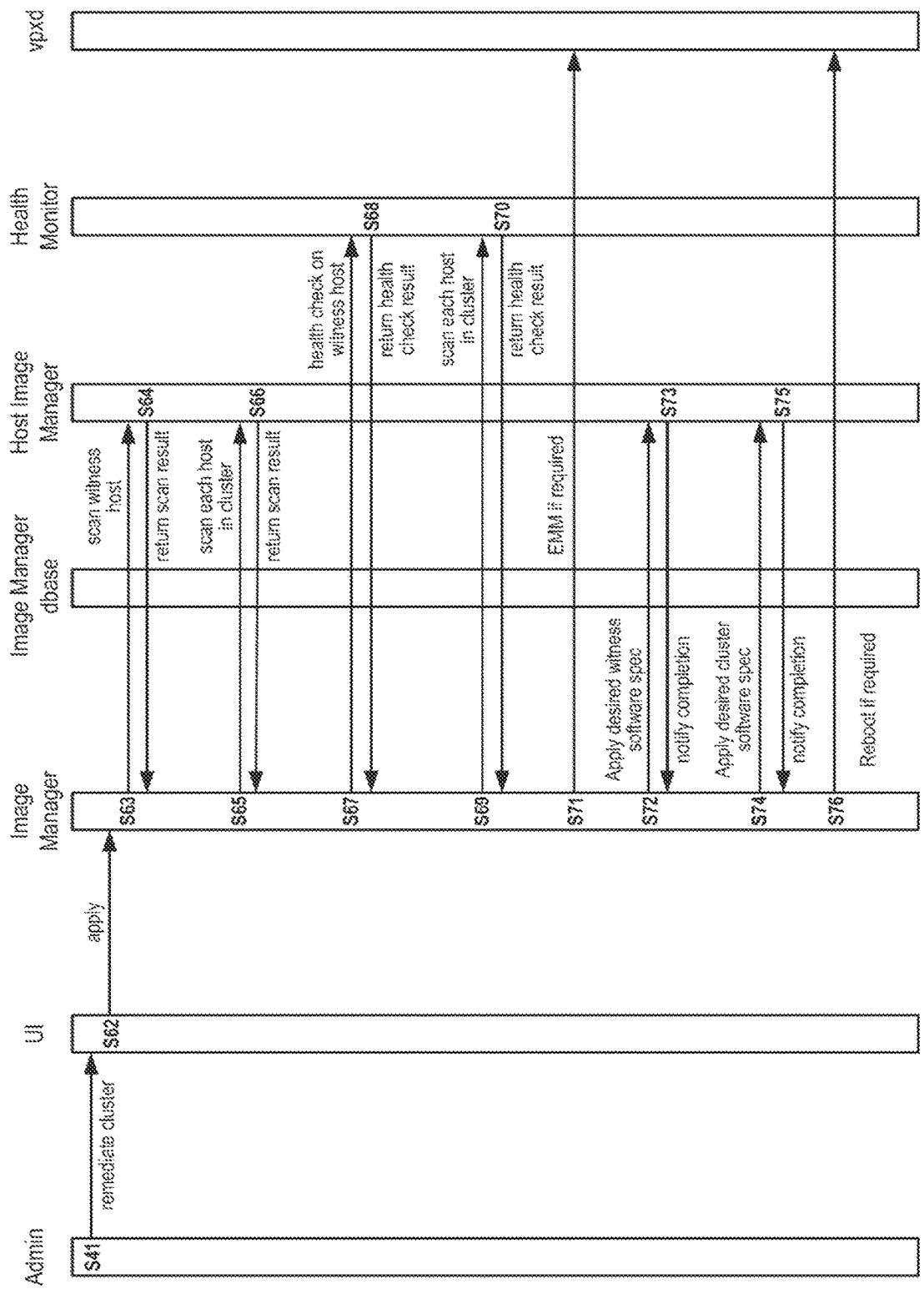
FIG. 6 is a command sequence diagram that depicts a process for applying the desired image of the virtualization software to the data nodes and the witness node.

FIG. 6 is a command sequence diagram that depicts a process for applying the desired image of the virtualization software to the data nodes and the witness node. The process depicted in FIG. 6 begins after the process of the process depicted in FIG. 5 has completed. At step S62, UI 101 issues a command to apply the desired image of the virtualization software to the VSAN cluster. In response to the command to apply issued at step S62, image manager performs a compliance scan on all hosts of the VSAN cluster (steps S63 to S66), and a health check on all hosts of the VSAN cluster (steps S67 to S70). The compliance scan is performed in the same manner as S28 to S31 and is repeated here to identify any host of the VSAN cluster that became non-compliant since the compliance check was last performed. The health check is performed by health monitor 106 to ensure that all hosts of the VSAN cluster to which the desired image of the virtualization software will be applied, are operational.

Steps S71 to S76 are executed for each host of the VSAN cluster that is non-compliant. If the non-compliant host is required to enter the maintenance mode, image manager 112 at step S71 communicates this to vpxd process 105, which in turn instructs the vpxa process running in the non-compliant host to enter the maintenance mode. If a data node is to enter the maintenance mode, the components of VSAN objects stored in local disks thereof may need to be moved to another data node in accordance with VSAN's evacuation policy. The witness node does not have any components of VSAN objects stored therein and is thus not subject to any such evacuation policy.

At steps S72 and S73, image manager 112 communicates with the host image manager running in the witness node to apply the desired image of the virtualization software thereto. After the desired image of the virtualization software has been applied to the witness node, image manager 112 communicates with the host image manager running in each data node at steps S74 and S75 to apply the desired image of the virtualization software thereto. Additional details of the "apply" process are described in U.S. patent application Ser. No. 16/939,117. After the "apply" process, image manager 112 determines whether any of the hosts to which the desired image of the virtualization software has been applied, is required to be rebooted. If so, image manager 112 at step S76 communicates this to vpxd process 105, which in turn instructs the vpxa process running in any such host to reboot.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of remediating an image of a first virtualization software installed in each of a plurality of first hosts based on a desired image of the first virtualization software and an image of a second virtualization software installed in a second host based on a desired image of the second virtualization software, wherein each of the first hosts include local disks and the local disks of the first hosts are aggregated and provisioned as a virtual storage device, and the second host tracks metadata of components of objects stored in the virtual storage device, said method comprising:
generating a desired image of the second virtualization software from a desired image of the first virtualization software and configuration information of the second virtualization software; and
upon detecting a difference between the image of the second virtualization software, which is currently running in the second host, and the desired image of the second virtualization software, instructing the second host to remediate the image of the second virtualization software currently running in the second host to match the desired image of the second virtualization software.

2. The method of claim 1, wherein the second host does not store any of the components.

3. The method of claim 1, further comprising:
upon detecting, in one or more of the first hosts, a difference in the image of the first virtualization software which is currently running therein, and the desired image of the first virtualization software, instructing said one or more of the first hosts to remediate the image of the first virtualization software currently running therein to match the desired image of the first virtualization software.

4. The method of claim 3, wherein said one or more of the first hosts is instructed to apply the desired image of the first virtualization software after a notification is received that the second host has applied the desired image of the second virtualization software.

5. The method of claim 1, wherein
a first group of the first hosts is located in a first availability zone and a second group of the first hosts is located in a second availability zone, and the second host is in a third availability zone, and
the local disks of the first hosts in the first availability zone store a first copy of the components and the local disks of the second hosts in the second availability zone store a second copy of the components.

6. The method of claim 5, wherein the first, second, and third availability zones are respectively located in geographically different data centers.

7. The method of claim 1, wherein the first hosts are in a first availability zone and the second host is in a second availability zone, the first hosts including a first data node storing a first copy of the components and a second data node storing a second copy of the components.

8. The method of claim 7, wherein the first and second availability zones are respectively located in geographically different data centers.

9. The method of claim 1, wherein the first hosts and the second host are in the same availability zone, the first hosts including a first data node storing a first copy of the components and a second data node storing a second copy of the components.

10. A computer system in which local disks of a plurality of hosts are aggregated and provisioned as a virtual storage device that store data as objects, the computer system comprising:
a plurality of first hosts each executing a first virtualization software to support a process for storing components of the objects across local disks thereof;
a second host executing a second virtualization software to support a process for managing metadata of the components of the objects; and
a management server configured to remediate an image of the first virtualization software running in the first hosts based on a desired image of the first virtualization software and an image of the second virtualization software running in the second host based on a desired image of the second virtualization software, by performing the steps of:
generating the desired image of the second virtualization software from the desired image of the first virtualization software and configuration information of the second virtualization software; and
upon detecting a difference between the image of the second virtualization software, which is currently running in the second host, and the desired image of the second virtualization software, instructing the second host to remediate the image of the second virtualization software currently running in the second host to match the desired image of the second virtualization software.

11. The computer system of claim 10, wherein the second host does not store any of the components.

12. The computer system of claim 10, wherein the steps performed by the management server further include:
upon detecting, in one or more of the first hosts, a difference in the image of the first virtualization software which is currently running therein, and the desired image of the first virtualization software, instructing said one or more of the first hosts to remediate the image of the first virtualization software currently running therein to match the desired image of the first virtualization software.

13. The computer system of claim 12, wherein said one or more of the first hosts is instructed to apply the desired image of the first virtualization software after a notification is received that the second host has applied the desired image of the second virtualization software.

14. The computer system of claim 10, wherein
a first group of the first hosts are located in a first availability zone and a second group of the first hosts are located in a second availability zone, and the second host is in a third availability zone, and
the local disks of the first hosts in the first availability zone store a first copy of the components and the local disks of the second hosts in the second availability zone store a second copy of the components.

15. The computer system of claim 10, wherein the first hosts are in a first availability zone and the second host is in a second availability zone, the first hosts including a first data node storing a first copy of the components and a second data node storing a second copy of the components.

16. The computer system of claim 10, wherein the first hosts and the second host are in the same availability zone, the first hosts including a first data node storing a first copy of the components and a second data node storing a second copy of the components.

17. A non-transitory computer readable medium storing instructions that are executable in a computer system, wherein the instructions are executed in the computer system to carry out a method of remediating an image of a first virtualization software installed in each of a plurality of first hosts based on a desired image of the first virtualization software and an image of a second virtualization software installed in a second host based on a desired image of the second virtualization software, wherein each of the first hosts include local disks and the local disks of the first hosts are aggregated and provisioned as a virtual storage device, and the second host manages metadata of components of objects stored in the virtual storage device, said method comprising:
generating a desired image of the second virtualization software from a desired image of the first virtualization software and configuration information of the second virtualization software; and upon detecting a difference between the image of the second virtualization software, which is currently running in the second host, and the desired image of the second virtualization software, instructing the second host to remediate the image of the second virtualization software currently running in the second host to match the desired image of the second virtualization software.

18. The non-transitory computer readable medium of claim 17, wherein the method further comprises:

upon detecting, in one or more of the first hosts, a difference in the image of the first virtualization software which is currently running therein, and the desired image of the first virtualization software, instructing said one or more of the first hosts to remediate the image of the first virtualization software currently running therein to match the desired image of the first virtualization software.

19. The non-transitory computer readable medium of claim 18, wherein said one or more of the first hosts is instructed to apply the desired image of the first virtualization software after a notification is received that the second host has applied the desired image of the second virtualization software.

20. The non-transitory computer readable medium of claim 17, wherein the second host does not store any of the components.

* * * * *